United States Patent [19]

Jourde et al.

[11] Patent Number: 5,636,420
[45] Date of Patent: Jun. 10, 1997

[54] NEEDLING MACHINE AND NEEDLING METHOD RELATED THERETO

[75] Inventors: Bernard Jourde, Elbeuf; Robert Jean, Fouqueville Par Amfreville; Jean-Claude Robin, Caudebec Les Elbeuf, all of France

[73] Assignee: Asselin, Elbeuf Cedex, France

[21] Appl. No.: 686,436

[22] Filed: Jul. 26, 1996

Related U.S. Application Data

[63] Continuation of Ser. No. 446,602, May 23, 1995, abandoned.

[30] Foreign Application Priority Data

Nov. 23, 1992 [FR] France .................. 92 14038

[51] Int. Cl.$^6$ .................. D04H 18/00; H02P 7/74
[52] U.S. Cl. .................. 28/107; 28/111
[58] Field of Search .................. 28/107, 108, 109, 28/110, 111, 112, 113

[56] References Cited

U.S. PATENT DOCUMENTS 2,864,040  12/1958  Trotsky .................. 318/8
4,476,424  10/1984  Kalman .................. 318/832

FOREIGN PATENT DOCUMENTS 0 026 690   4/1981  European Pat. Off.
2.218.416   9/1974  France.
2 263 949   7/1974  Germany.
WO82/01283  4/1982  WIPO.

OTHER PUBLICATIONS

Hans–Detlef Hoepp, "Messen und Regeln in der Nadelfilz--industrie", Melliand Textilberichte, Feb. 1971, pp. 155–164.

Primary Examiner—John J. Calvert
Attorney, Agent, or Firm—Young & Thompson

[57] ABSTRACT

Two needling assemblies have needle boards and alternating motion mechanisms. A motor is provided for each needling assembly. The needling assemblies are mechanically independent of each other. The motors are connected by an angular position servo-mechanism. The needling machine is used to eliminate the mechanical resonance between needling assemblies and to diversify and facilitate the adjusting possibilities.

21 Claims, 5 Drawing Sheets

FIG_1

FIG_2

FIG_4

FIG.6

FIG_7

NEEDLING MACHINE AND NEEDLING METHOD RELATED THERETO

This application is a continuation of application Ser. No. 08/446,602, filed May 23, 1995, now abandoned.

The present invention relates to a needling machine for textile cloth, in particular for non-woven cloth, comprising at least two needling assemblies.

The present invention also relates to a needling method able to be implemented with this needling machine.

From EP-A-26690 there is known a needling machine of the type mentioned at the beginning, wherein the two needling assemblies are driven by a motor connected to the various needling assemblies by mechanical transmissions comprising shafts, angle gearboxes and toothed belts.

In this way synchronisation is achieved between the various needling assemblies. This synchronisation makes it possible to cause the cloth to progress in a regular manner during certain work phases when all of the needles are withdrawn from the cloth.

In general it is considered that needling machines having two needling assemblies, often called "double strike" needling machines, have the advantages of mechanical equilibrium.

In particular, simultaneous superimposed double striking is known, wherein two needling assemblies located on the same vertical axis, one facing the top of the cloth and the other facing the bottom of the cloth, are actuated in such a way that they penetrate simultaneously through the cloth.

In this way there is obtained the theoretical advantage that the inertias of the two needling assemblies compensate each other in such a way as to reduce vibrations.

Alternated double striking is also known according to which, with the same basic arrangement, there is a 180° cycle phase difference between them such that one of the needling assemblies is completely withdrawn from the cloth when the other needling assembly is in the state of maximum penetration.

This configuration appears even more advantageous than the preceding one as it makes it possible to balance first order vibratory forces with an off-centred counterweight for each needling assembly and it naturally balances second order vibratory forces, that is to say those whose frequency is double that of the cyclic frequency of the needling assemblies.

Furthermore, the strike forces are better distributed around turn, and the force of penetration of each assembly is partly produced by the inertia of the other assembly.

In reality, the vibratory behaviour of the known needling machines having two needling assemblies often proves to be disappointing. It has been found, according to the invention, that the transfers of inertial force in the machine, in particular between one of the two needling assemblies and the other, cause resonances which add to the normal resonances of each needling assembly.

Furthermore, these machines having two needling assemblies are difficult or impossible to modify or to adjust in order to change the angular setting between the two needling assemblies and in order to modify the strike density on one of the faces of the cloth with respect to the other. This density ratio can be modified only by using needle boards having a larger or smaller number of needles per unit area. This is complicated to achieve. Furthermore, variation of the number of needles per unit area is generally only achievable by elimination of needles starting from a situation of maximum density, and in practice it is often observed that the elimination of numerous needles degrades the appearance of the needled product obtained, with the appearance of undesired patterns.

The purpose of the invention is thus to propose a needling machine and a needling method which overcome this disadvantage and which, in particular, make it possible to adjust the needling conditions easily, in particular the phase difference, and the density ratio between the two needling assemblies, and which considerably improve the vibratory behaviour of the needling machine.

According to a first aspect of the invention, the needling machine comprising guidance means for a textile cloth, at least two needling assemblies each comprising at least one needle board driven by an alternating motion mechanism, and motor means for driving the said mechanisms in a conjugated manner, is characterized in that the motor means comprise a respective motor for each needling assembly, and in that the needling machine comprises servo-control means to conjugate the motors in angular position.

According to a second aspect of the invention, the method of needling a textile cloth by at least two needling assemblies each of which comprises at least one needle board and which is driven with reciprocating movements which are conjugated in position, is characterized in that a respective motor is used for each needling assembly, and in that the motors are conjugated in angular position by a servo-mechanism.

Thus, by means of the invention, it is no longer necessary to couple the two needling assemblies with each other mechanically, and in this way the resonances due to transfers of energy between the two needling assemblies are avoided. The balancing properties of each configuration are retained however, and consequently the vibratory result is entirely positive.

Preferably, the servo-control means are adjustable in order to modify the angle of phase difference between the two motors. It is thus possible to adjust the angle of phase difference in order to establish a cyclic phase difference between the two needling assemblies different from 0° and 180° of angle and thus to obtain needled cloths having different needling characteristics from those obtained with the prior art. Furthermore, the adjustment is particularly simple to carry out, for example by entering a command intended for the servo-control means.

The servo-control means can also be adapted to define an integer speed ratio between the speeds of the two motors different from 1.

It is thus possible to define, in a new way, the ratio between the strike densities produced by the two needling assemblies, and to obtain a needled product whose appearance is not degraded by a modification of the needle boards.

Other features and advantages of the invention will again emerge from the following description relating to non-limitative examples.

Figure 1:
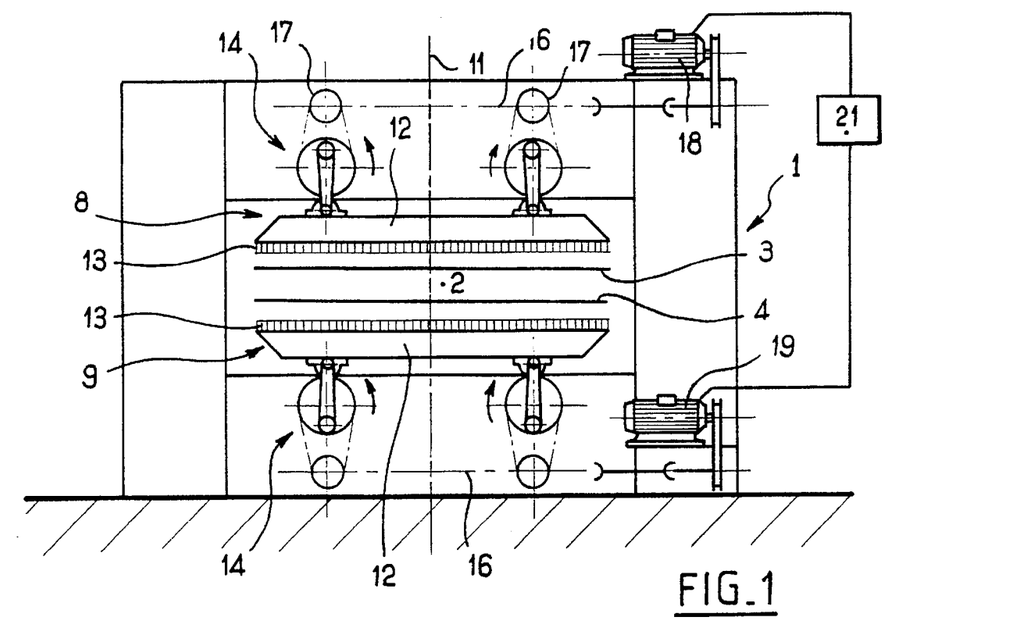
FIG. 1 is a front view of a needling machine according to the invention.
Figure 3:
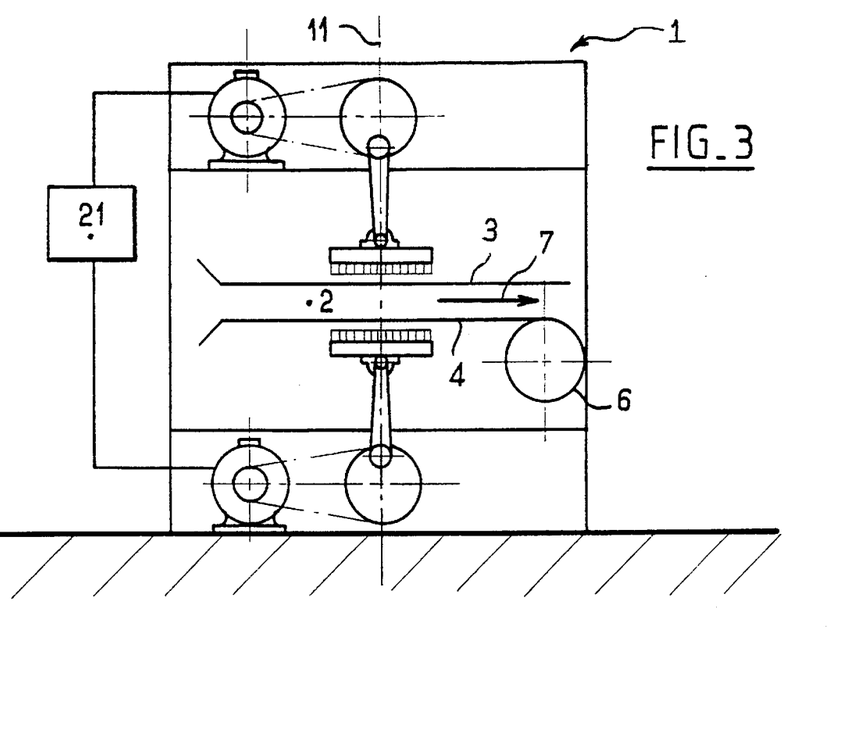
FIG. 3 is a diagrammatic view in longitudinal section of the needling machine of FIGS. 1 and 2.

In the example shown in FIG. 1, the needling machine comprises a frame 1. Guidance means consisting of two plates 3, 4 define the needling path 2 traversing the frame 1. As shown in FIG. 3, the needling machine furthermore comprises a drive roller 6 which, when in service, is driven in rotation in order to cause a non-woven cloth (not shown) to progress between the plates 3 and 4 in a direction called longitudinal, parallel with the arrow 7.

The needling machine furthermore comprises two needling assemblies, namely an upper needling assembly 8 and a lower needling assembly 9 which are disposed on the same vertical axis 11.

The upper needling assembly 8 and the lower needing assembly 9 are disposed above and below the needling path 2 respectively. They each comprise a needle board 12 whose needles 13 are directed towards the needling path 2. The needles 13 can traverse the suitably perforated adjacent plate 3 or 4, as shown diagrammatically in FIG. 2 for the upper needling assembly 8.

Each needle board 12 is connected to an alternating motion mechanism 14 comprising, in the example, two rod-crank systems connected of a common shaft 16 by angle gearbox devices 17 in such a way that the two rod-crank systems rotate in opposite directions in order to balance out certain inertia forces.

Each common shaft 16, driving the alternating motion mechanism of a respective needling assembly 8 or 9, is connected to a respective motor 18 (upper needling assembly 8) or 19 (lower needling assembly 9).

The two common shafts 16 are mechanically independent from each other.

Furthermore, the needling machine comprises servo-control means 21 to conjugate the two motors 18 and 19 in angular position.

Figure 4:
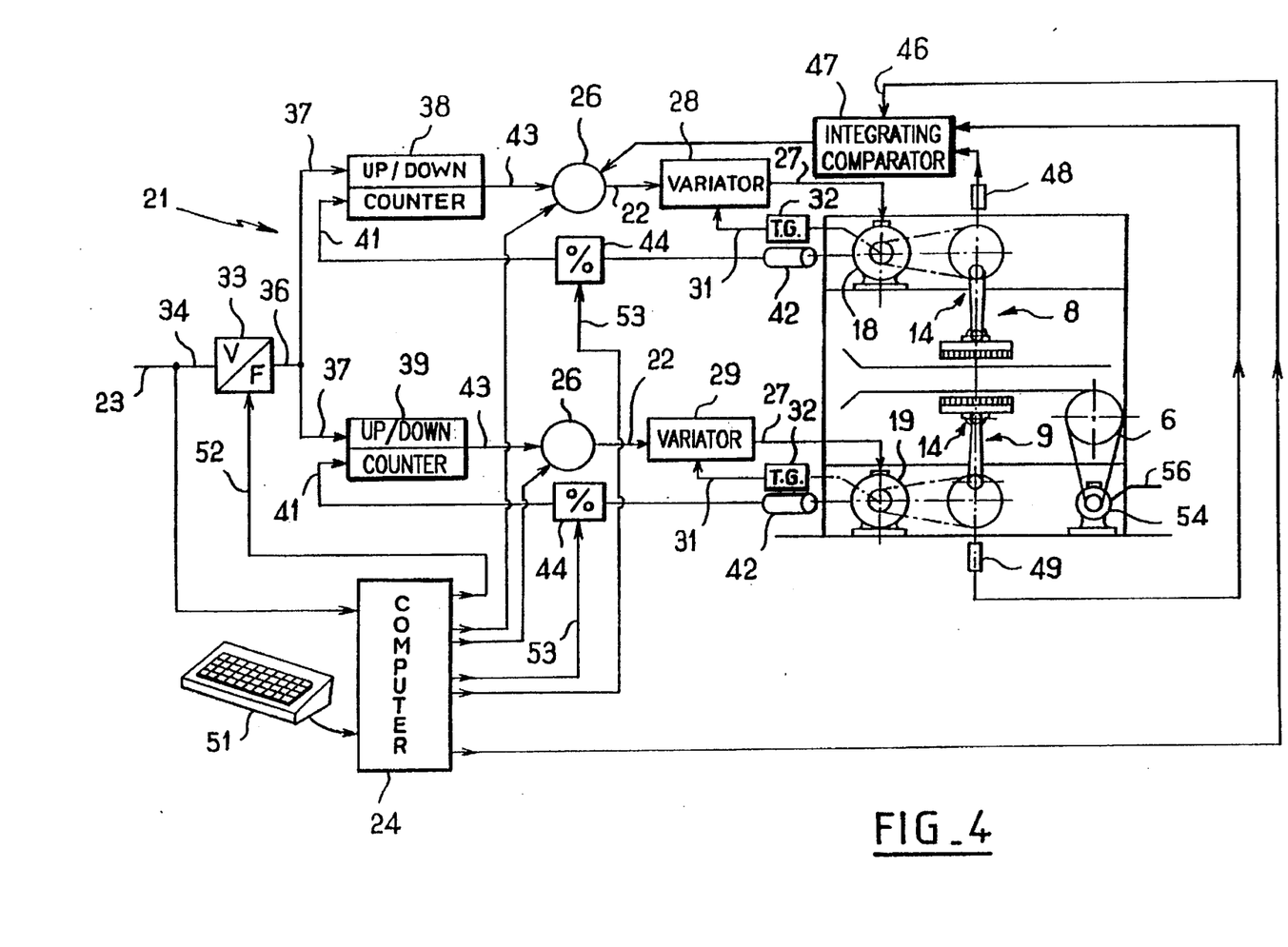
FIG. 4 is a block diagram of a first embodiment of the servo-mechanism connecting the two motors.

In the example shown in FIG. 4, the angular position servo-mechanism is constituted by a speed control with positional correction.

More particularly, the speed control means comprise, for each motor 18 and 19, a speed variator 28 and 29 respectively receiving on its control input 22 a speed command derived from an external control command arriving through an input 23 and distributed by a computer 24, through a summer 26 whose function will be described later. Each variator 28 and 29 sends a power instruction 27 to the associated motor 18 and 19 and receives from the associated motor 18 or 19, via a return line 31, a speed signal produced by a speed sensor such as a tachometric generator 32 associated with each of the motors 18 and 19. From the command present on its input 22 and the return signal present on the return line 31, the variator 28 or 29 modulates the control signal sent on the power line 27 so that the associated motor 18 or 19 maintains a speed corresponding as closely as possible to the command produced by the computer 24.

The signal present at the command input 23 is a signal coming from a computer controlling the whole of the manufacturing line to which the needling machine belongs, or it is a signal coming from the machine located immediately upstream of the needling machine, for example a spreading and fleecing machine, an uncurling machine or another needling machine.

The speed control which has just been described for the two motors 18 or 19 does not make it possible to ensure that the motors 18 and 19 have a stable and predetermined positional concordance.

That is why the device shown in FIG. 4 furthermore comprises means for correcting the speed commands applied to the inputs 22 of the variators 28 and 29 in order to conjugate the two motors 18 and 19 in angular position.

For this purpose, the servo-control means 21 comprise a voltage-frequency converter 33 receiving the external command signal on its input 34 and supplying on its output 36 a signal whose frequency is representative of this command.

The frequency produced on the output 36 of the voltage-frequency converter is applied to the upcounting input 37 of each of two reversible counters 38 and 39 associated with the motors 18 and 19 respectively. The down-counting input 41 of each reversible counter 38, 39 is connected to an angular position sensor 42 associated with each respective motor 18 or 19.

The sensors 42 are of the incremental type, that is to say they produce a pulse each time the shaft of the associated motor has rotated through a predetermined angle, such that the frequency of these pulses is, in principle, exactly proportional to the speed of rotation of the motors in a well determined ratio.

Thus, the signal at the output 43 of each reversible counter 38 or 39 indicates if the associated motor 18 or 19 has actually carried out the total rotation corresponding to the number of pulses received on the up-counting input 37, or if on the contrary it exhibits a delay or an advance. The signal on the output 43 of each reversible counter is applied to the input of the summer 26 leading to the associated variator 28 or 29, in order to modify the speed command produced by the computer 24 in the sense of an increase if the motor 18 or 19 exhibits an angular position delay or a reduction if it exhibits an angular position advance.

Position control by reversible counting has the advantage of high short-term accuracy for a reasonable cost.

With regard to the long term accuracy, it can happen that interference disturbs the counting of pulses, for example one or more pulses may not be counted up or counted down. In order to overcome this difficulty, the servo-control means 21 of FIG. 4 furthermore comprise predefined angular position sensors 48 and 49 cooperating with the alternating motion mechanisms 14 in order, once every revolution of these mechanisms, to detect any angular difference between them. This difference detection is carried out in an integrating comparator 47 and the result of this comparison is applied to a third input of one of the summers 26 in order to make an additional correction to the command applied to the corresponding variator (variator 28 in the example).

In order to prevent the corrections carried out from the comparator 47 from interacting unfavourably with those produced by an output 43 of the reversible counters 38 and 39, the comparator 47 is of a type which integrates the errors recorded over a predetermined period and makes corrections only at the end of this period if the integrated error exceeds a certain threshold.

The comparator 47 comprises a control input 46 through which the computer 24 supplies it with a signal representing the angular phase difference between the two motors 18 and 19 and consequently between the two alternating motion mechanisms 14.

The computer 24 is connected to a keyboard 51 with which an operator can control the computer in order to adjust the desired phase difference between the two needling assemblies 8 and 9.

By means of the keyboard 51, the operator can also impose a speed ratio between the two motors 18 and 19, this ratio being chosen to be an integer, in order that, for example, the upper needling assembly 8 carries out two needling cycles whilst the lower needling assembly carries out only one needling cycle. In order to allow for this possibility, the signal from the sensors 42 is applied to the down-counting inputs 41 of the reversible counters 38 and 39 by the intermediary of a frequency divider 44 which is controlled by the computer 24 in order to divide by two, in the preceding example, the pulse frequency applied to the down-counting input 41 of the fastest needling assembly 8, so that it is half of the frequency produced by its sensor 42 which is compared with the frequency 36 produced by the voltage frequency converter 33. For this purpose, the voltage frequency dividers have a control input 53 connected to the computer 24.

In a way which is not shown, if an adjustment has been made such that the two needling assemblies 8, 9, are functioning with a speed ratio other than 1, a line ending at another input of the comparator 47 informs the latter of the speed ratio to be maintained between the two needling assemblies 8 and 9.

The keyboard 51 also makes it possible to adjust the general speed of the machine with respect to the command applied to the command input 23. In other words, if the command 23 is representative of the speed at which the cloth to be needled penetrates into the needling machine, it may, for the same input speed, be desired to have faster or slower striking rates according to the product which is entering and the needled product which is desired to be produced. The computer 24 produces on the inputs 22 of the variators 28 and 29 command signals corresponding to the absolute speeds required for the motors 18 and 19 respectively. Furthermore, the computer 24 applies to the control input 52 of the voltage-frequency converter a signal which controls the voltage-to-frequency ratio produced by the converter 33 taking account of the desired ratio between the external command and the general speed of the machine.

As also shown in FIG. 4, the drive roller 6 is driven by a specific servo-motor 54 which receives a speed command on an input 56. It is possible to use the speed command signal applied to the input 56 of the servo-motor 54 as a speed command for the computer 24 and the input 34 of the voltage-frequency converter instead of the signal supplied through an input 23 and coming from the exterior. As the precise relationship between the command applied to the servo-motor 54 and the actual speed of rotation of that servo-motor is generally known accurately, the computer is thus informed of the actual speed of progress of the non-woven cloth in the needling machine and can consequently adjust the striking rates of the two needling assemblies 8 and 9 in order to produce a well determined needling density on each face of the needled product.

FIG. 1 shows the two needle boards 13 in their withdrawn position. Starting from this position, if the speed ratio between the two needling assemblies 8 and 9 is equal to 1, the two needle boards 13 will both be in the position of maximum penetration after a rotation of 180° of each rod-crank assembly 14: the operation is therefore of the simultaneous striking type.

Figure 2:
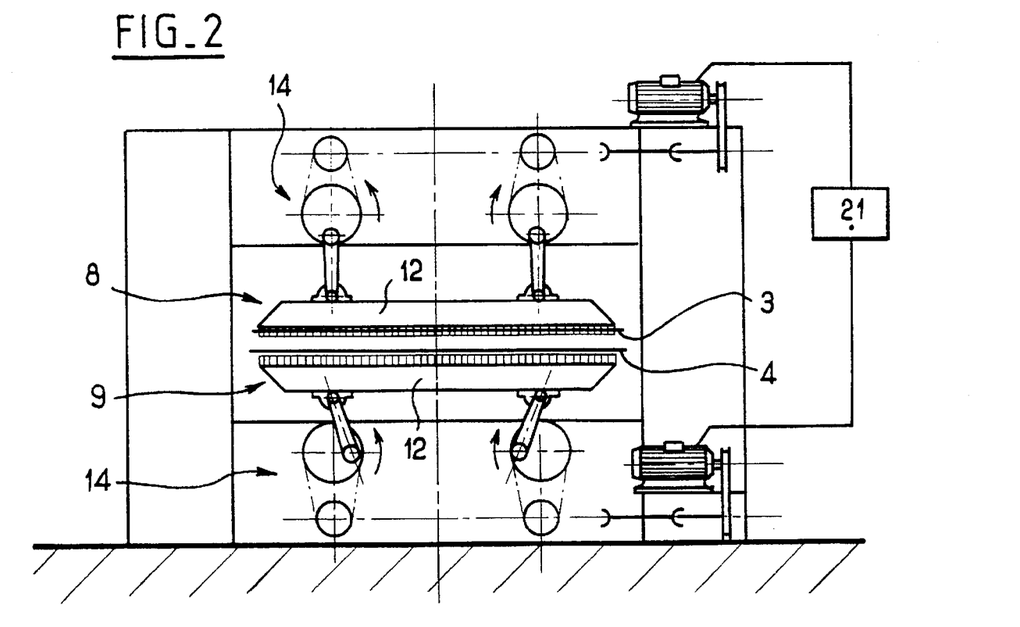
FIG. 2 is a front view of the needling machine of FIG. 1 at another stage of work.

If, on the contrary, the striking rate of the lower needling assembly 9 is two times slower than that of the upper needling assembly 8, the situation after a half-turn of rotation of the upper mechanism 14 and consequently after a quarter of a revolution of the lower mechanism 14, will be as shown in FIG. 2, where the upper needle board 12 is in the position of maximum penetration whilst the lower needle board 12 is in an intermediate position.

But the position shown in FIG. 2 can also correspond to the case in which, for example, the speed of rotation of the two needling assemblies 8 and 9 is the same but with an angular phase difference of 90° between the two needling assemblies 8 and 9.

Figure 5:
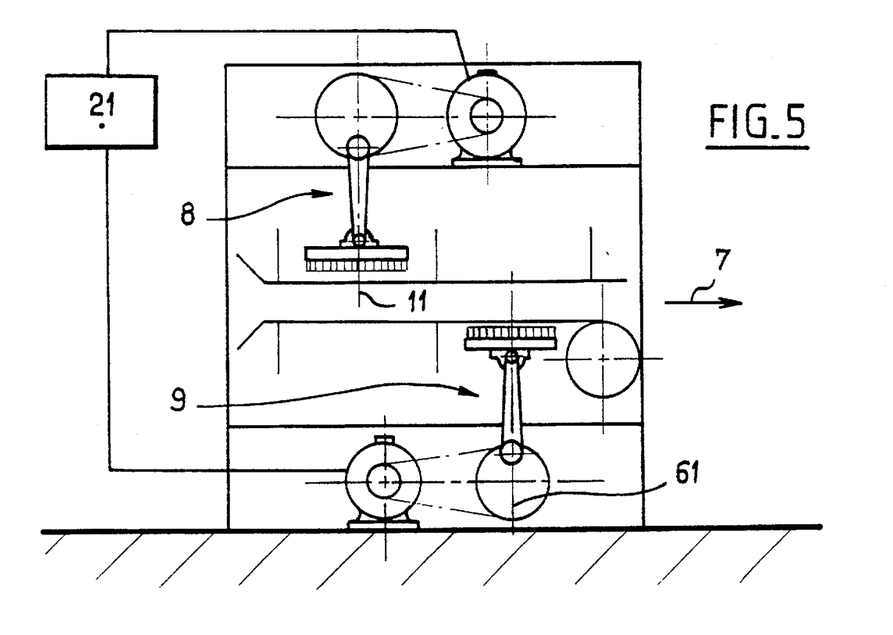
FIGS. 5 and 6 are views similar to FIG. 3 but relating to two variant embodiments.

FIG. 5 shows a variant embodiment of the needling machine. The two needling assemblies 8 and 9, instead of being disposed on the same vertical axis 11, are disposed on two vertical axes 11 and 61 which are offset from each other in the direction 7 of displacement of the textile cloth through the needling machine.

It should also be noted that in FIGS. 3 and 5 the alternating motion mechanisms have been shown in the form of a linkage whose articulation axes are parallel with the transverse direction of the machine, whilst in FIGS. 1 and 2, the linkages are seen again but the axes of rotation are oriented in the longitudinal direction of the machine, that is to say in the direction of displacement of the textile cloth through the machine. These two arrangements can be produced at choice.

Figure 6:
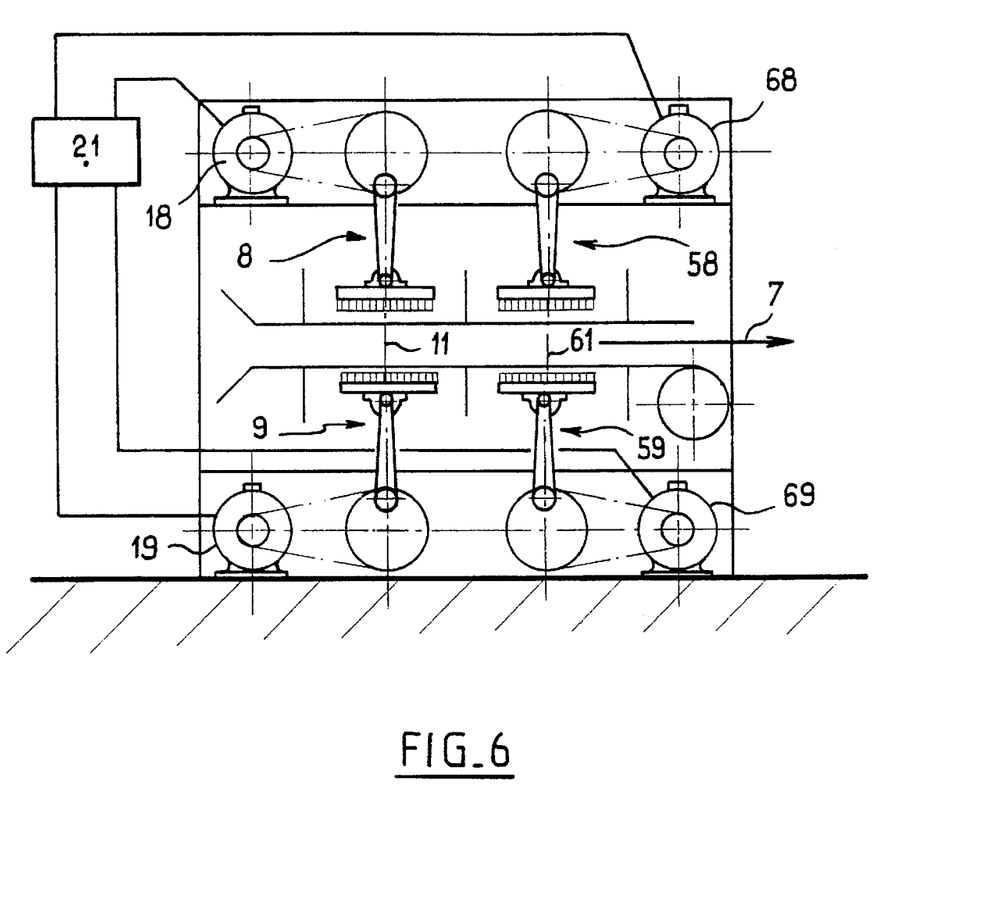

FIG. 6 shows yet another example of configuration, with four needling assemblies, namely two upper needling assemblies 8, 58 and two lower needling assemblies 9, 59, and each needling assembly is associated with a respective drive motor 18, 19, 68, 69 independent from the other three needling assemblies. The needling assemblies 8 and 9 are disposed on the same vertical axis 11 and the needling assemblies 58 and 59 are disposed on the same vertical axis 61 which is offset with respect to the axis 11 in the direction 7 of displacement of the textile cloth through the needling machine.

The example shown in FIG. 7, which will be described only where it differs from that of FIG. 4, relates to another method of servo-control of the angular position between the needling assemblies in a needling machine comprising three needling assemblies 8, 9, 58 driven independently from each other by three motors 18, 19, 68 respectively.

The three motors 18, 19, 68 are slaved to a speed command coming from the computer 24 connected to a command input 23. For this purpose, each motor 18, 19, 68 cooperates with a variator 28, 29, 78 as has been said for the variators 28 and 29 of FIG. 4. The signal applied to the input 22 of each of the electronic variators 28 and 29 comes, as in FIG. 4, from a summer 26 capable of correcting the speed command in order to compensate for the positional differences detected by means of a reversible counter 38, 39 whose down-count input 41 receives, by the intermediary of a frequency divider 44, a signal coming from an incremental sensor 42 connected to the associated motor 18 or 19.

On the other hand, the needling assembly 58 is not subjected to angular position compensation. On the contrary, it is from the needling assembly 68 that the frequency applied to the up-count inputs 37 of the reversible counters 38 and 39 will be produced. For this purpose, the motor 68 of the needling assembly 58 is associated with an incremental sensor 82 similar to the sensors 42 of the assemblies 8 and 9 and the signal produced by the incremental sensor 82 is applied to the up-count inputs 37 by the intermediary of a frequency divider 84 having a control input 93 connected to the computer 24 for example in order to divide the frequency applied to the inputs 37 by two with respect to that produced by the incremental sensor 82 when it is desired that the rate of the assemblies 8 and 9 is to be two times slower than that of the assembly 58.

Furthermore, the signals of the predefined angular position sensors 48 and 49 of the assemblies 8 and 9, instead of being compared with each other in a single comparator 47, are each compared in a respective integrating comparator 87 with the signal produced by a predefined angular position sensor 88 of the assembly 58. Each comparator 87 has an input 46 making it possible for the computer 24 to apply to it a command for a phase difference with respect to the needling assembly 58. The output signal of each comparator 87 is applied to a summer 26 associated with the corresponding needling assembly 8 or 9.

Figure 7:
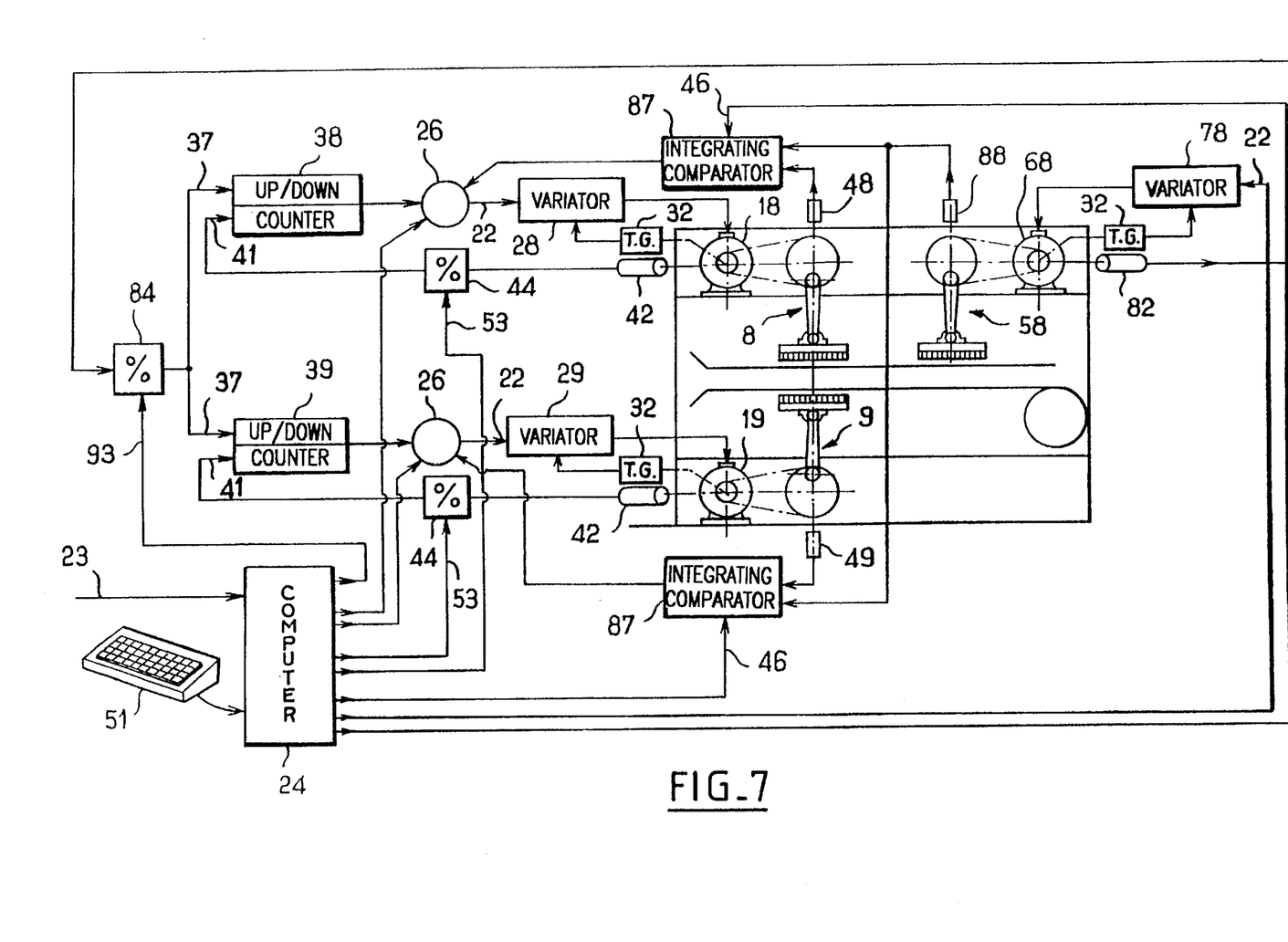
FIG. 7 is a view similar to FIG. 4 but relating to another embodiment of the servo-mechanism, in the case of a needling machine having three needling assemblies.

In brief, in the example of FIG. 7, the motor 68 is a master motor and the motors 18 and 19 are slave motors. The variator 78 associated with the motor 68, receives on its command input 22 a signal coming directly from the computer 24.

The servo-control method of FIG. 4 is preferred to that of FIG. 7 because in the servo-control method of FIG. 4, which can be applied to configurations having more than two needling assemblies, each needling assembly follows an external command independently from the others. In the event of disturbance in a needling assembly, the other assemblies can continue the cycle undisturbed. On the contrary, in the example of FIG. 7, a disturbance in the master needling assembly 58 risks disturbing the slave assemblies 8 and 9.

In all of the examples, the transfers of mechanical energy between two needling assemblies are eliminated, as are the resonances and other cyclic disturbances which may result from them. Furthermore, it is possible to adjust the speed ratios and/or phase differences between the different needling assemblies very conveniently by means of the keyboard 51. Non-integer speed ratios are avoided however since they cause irregularities in the progression of the product through the needling machine and finally in the needling density of the product obtained.

The invention is of course not limited to the embodiments shown and described.

In order to achieve positional servo-control, it would be possible, referring to FIG. 4, to eliminate the predefined angular position sensors 48 and 49 and the comparator 47. In this case, it is necessary to provide the two needling assemblies with the phase difference desired between them manually before starting the needling machine. Then, after the motors have started, the incremental sensors 42 and the reversible counters 38 and 39 strictly maintain the desired speed ratio and consequently the initial phase difference is also retained. Reversible counting errors which are able to produce, after a long time, a certain error in the phase difference can be corrected from time to time by briefly stopping the machine and manually resetting the needling assemblies with respect to each other.

It would also be possible to replace the incremental sensors 42 and the predefined angular position sensors 48 and 49 with absolute angular position sensors associated with the shafts of the motors 18 and 19, but this solution can be more expensive.

It would be possible to build the comparator or comparators 47, 87 into the computer 24.

Rather than using a frequency divider 44 or 84 at the output of each sensor 42 or 82 in order to be able to reduce any of the needling assembly speeds with respect to the speeds of the other needling assemblies, it would be possible to use devices able to function both as a multiplier and as a divider. This would make it possible to provide only one multiplier/divider instead of two dividers in FIG. 4, and two multiplier/dividers instead of three dividers in FIG. 7. In fact, if the device such as 44 is capable not only of dividing but also of multiplying, it is possible, for example in the case of FIG. 4 having two needling assemblies, to multiply the frequency associated with one of the needling assemblies rather than to divide that produced by the other needling assembly.

In the device of FIG. 7, switching means could be added making it possible to select which one of the three motors 18, 19 and 69 must function as master and those which must function as slaves. A priori, it is advantageous to give the master function to the needling assembly operating at the fastest rate. Thus the adjustments resulting from the positional servo-control are carried out on the slower assemblies, in which the inertia forces are therefore weaker.

I claim:

1. Needling machine comprising guidance means for guiding a textile web, at least two assemblies for needling a web, each having at least one needle board, at least two alternating motion mechanisms for driving said at least two needling assemblies respectively, motor means for driving said at least two alternating motion mechanisms in a conjugated manner, wherein the motor means comprise a respective motor for each of said at least two needling assemblies, speed servo-control means to couple the motors in angular position, reversible counter means to detect the positional deviation of at least one of the motors, and means for correcting the positional deviation operatively connected to the speed servo-control means.

2. Needling machine according to claim 1, wherein the servo-control means are adjustable in order to modify a phase difference angle between the motors.

3. Needling machine according to claim 1, wherein the servo-control means define an integer speed ratio different from 1 between the speeds of the motors.

4. Needling machine according to claim 1, wherein the servo-control means comprise means for modifying a speed command (22) of the speed servo-control means as a function of detected positional deviations.

5. Needling machine according to claim 1, wherein the means of detecting the positional deviations comprise, for each motor whose positional deviations are detected, a reversible counter one of whose inputs is connected to a motion censor of the associated motor and whose other input is connected to a reference frequency source.

6. Needling machine according to claim 1, further comprising means for further detecting and correcting durable positional deviations.

7. Needling machine according to claim 6, wherein the means of detecting and correcting the durable positional deviations comprise an integrating comparator supplying a correction signal when an integral of the deviations recorded over a predetermined period exceeds a predetermined threshold.

8. Needling machine comprising guidance means for guiding a textile web, at least two assemblies for needling a web, each having at least one needle board, at least two alternating motion mechanisms for driving said at least two needling assemblies respectively, motor means for driving each of said at least two alternating motion mechanisms in a conjugated manner, wherein the motor means comprise a respective motor for each of said at least two needling assemblies, and servo-control means conjugating each motor with a positional reference signal thereby to couple the motors to each other in angular position.

9. Needling machine according to claim 8, further comprising means for generating from a reference signal a speed reference signal for the speed servo-control and the positional reference signal.

10. Needling machine comprising guidance means for guiding a textile web, at least two assemblies for needling a web, each having at least one needle board, at least two alternating motion mechanisms for driving said at least two needling assemblies respectively, motor means for driving each of said at least two alternating motion mechanisms in a conjugated manner, wherein the motor means comprise a respective motor for each of said at least two needling assemblies, speed servo-control means to couple the motors to each other in angular position, means to detect the positional deviation of at least one of the motors, positional deviation correcting means which are operatively connected to the servo-control means, means for generating a speed command from a speed reference signal, and means for generating a position command from the angular position of one of the motors functioning as a master motor with respect to at least one other of the motors.

11. Needling machine according to claim 10, wherein the master motor is slaved to the speed command.

12. Needling machine comprising guidance means for guiding a textile web, at least two assemblies for needling a web, each having at least one needle board, at least two alternating motion mechanisms for driving said at least two needling assemblies respectively, motor means for driving each of said at least two alternating motion mechanisms in a conjugated manner, wherein the motor means comprise a respective motor for each of said at least two needling assemblies, and servo-control means to couple the motors in angular position, wherein the servo-control means to couple the motors in angular position, wherein the servo-control means comprise means for slaving, the angular position of one of the motors to that of the other motor used as a positional reference.

13. Needling machine comprising guidance means for guiding a textile web, at least three assemblies for needling a web, each having at least one needle board, at least three alternating motion mechanisms for driving said at least three needling assemblies respectively, motor means for driving each of said at least three alternating motion mechanisms in a conjugated manner, wherein the motor means comprise a respective motor for each of said at least three needling assemblies, and servo-control means to couple the motors in angular position, wherein the servo-control means comprise means for slaving to the angular position of one of the motors, used as a reference position, the angular position of the other two motors.

14. Needling machine according to claim 13, wherein the servo-control means comprise means for selecting the motor whose angular position is used as a reference position.

15. Needling machine comprising guidance means for guiding a textile web, at least two assemblies for needling a web, each having at least one needle board, at least two alternating motion mechanisms for driving said at least two needling assemblies respectively, motor means for driving each of said at least two alternating motion mechanisms in a conjugated manner, wherein the motor means comprise a respective motor for each of said at least two needling assemblies, and servo-control means to couple the motors in angular position, wherein the servo-control means to couple the motors in angular position, wherein the servo-control means comprise means for generating a control command for the motors from a reference external to the motors.

16. Needling machine according to claim 15, comprising means for receiving a reference signal from outside said needling machine, and wherein said means for generating a control command generate said control command from said reference signal.

17. Needling machine according to claim 15, wherein said means for generating a control command generate said control command from a functional parameter of a rotary member of the needling machine actuated independently from the motors.

18. Needling machine according to claim 15, wherein the servo-control means are adjustable in order to modify a phase difference angle between the motors.

19. Method for needling a textile web, the steps comprising:

providing at least two needling assemblies each having at least one needle board;

conjugating upward and downward motion of the assemblies;

providing a motor for each of said needling assemblies conjugating the motors in annular position by using a servo-mechanism; and guiding the web between the assemblies to needle the web.

20. Method according to claim 19, further comprising the step of conjugating the motors to establish a cyclic phase difference, different from 0° and 180° of angle, between the two needling assemblies.

21. Method according to claim 19, further comprising the step of conjugating the motors such that there speeds have an integer ratio different from one.

* * * * *